US006226522B1

(12) United States Patent
Higuchi

(10) Patent No.: US 6,226,522 B1
(45) **Date of Patent: *May 1, 2001**

(54) LOCATION DETECTING INFORMATION RECEIVING APPARATUS

(75) Inventor: Norihiko Higuchi, Shizuoka (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/062,958

(22) Filed: Apr. 20, 1998

(30) Foreign Application Priority Data

Apr. 24, 1997 (JP) .................................................. 9-107096

(51) Int. Cl.[7] ............................... H04Q 7/20; G08B 5/22

(52) U.S. Cl. ......................... 455/456; 455/457; 455/38.4; 340/825.44

(58) Field of Search .................................... 455/457, 38.4, 455/32.1, 38.1, 566, 456; 340/825.44, 825.47, 827

(56) References Cited

U.S. PATENT DOCUMENTS 4,766,434 * 8/1988 Matai et al. ........................ 455/38.4
5,539,395 * 7/1996 Buss et al. ...................... 340/825.44
5,565,909 * 10/1996 Thibadeau et al. ................... 455/4.2
5,726,643 * 3/1998 Tani .................................... 455/38.4
5,774,803 * 6/1998 Kariya .................................. 455/566
5,883,580 * 3/1999 Briancon et al. ............... 340/825.44
5,918,165 * 6/1999 Takatsuka ........................... 455/38.4
5,948,041 * 5/1999 Abo et al. ............................ 455/456

FOREIGN PATENT DOCUMENTS 5-63630 * 3/1993 (JP) ................................. H04B/7/26

OTHER PUBLICATIONS

Great Britain Search Report on Application No. BG 9808604.0, Oct. 1998.*

* cited by examiner

*Primary Examiner*—William G. Trost
*Assistant Examiner*—Rafael Perez-Gutierrez
(74) *Attorney, Agent, or Firm*—Scully, Scott, Murphy & Presser

(57) ABSTRACT

An information receiving apparatus is disclosed, which comprises: storing means for storing pairs of area information assigned for predetermined areas and area name thereof; area information detecting means for detecting area information contained in received information; area name detecting means for detecting an area name of the current position of the apparatus corresponding to the detected area information with reference to the storing means; searching means for searching for a message element for the area name of the current position of the apparatus among a message in the received information; and displaying means for displaying the searched message element on a displaying portion.

10 Claims, 5 Drawing Sheets

| AREA INFORMATION IN SYSTEM INFORMATION PORTION | 01 | 02 | | 18 | 19 | | 47 |
|---|---|---|---|---|---|---|---|
| AREA NAME | HOKKAIDO | AOMORI | ..... | SHIZUOKA | AICHI | ..... | OKINAWA |

LOCATION DETECTING INFORMATION RECEIVING APPARATUS

BACKGROUND OF THE INVENTION

1. Field of the Invention

The present invention relates to an information receiving apparatus for receiving various types of information and in particular, to an information receiving apparatus with a function for selectively displaying a message element corresponding to the current position of the apparatus.

2. Description of the Prior Art

FIG. 6 shows a conventional information receiving apparatus. Referring to FIG. 6, reference numeral 1 is an antenna. Reference numeral 2 is a radio portion. Reference numeral 3 is a controlling portion. Reference numeral 4 is an identification number storing portion. Reference numeral 5 is a speaker. Reference numeral 6 is a vibration motor. Reference numeral 7 is an LED. Reference numeral 8 is a displaying portion. A signal received by antenna 1 is supplied to radio portion 2. Radio portion 2 amplitudes and demodulates the signal received from antenna 1. The resultant signal is supplied to controlling portion 3. Controlling portion 3 decodes the signal supplied from radio portion 2 and compares a call number in the decoded information with a call number stored in identification number storing portion 4. When these call numbers are identical, controlling portion 3 retrieves relevant data from the decoded data. Thereafter, controlling portion 3 controls speaker 5, vibration motor 6, and LED 7 so that the user of the apparatus can know that a message has been received and displays the message on displaying portion 8.

Concerning information such as weather forecasting information, the user only needs to know local information such as local weather forecasting information. In this case, however, all the information is received and displayed regardless of the location of the user. Thus, the user had to spend much time for retrieving local information among all the information. In addition, the apparatus required a large capacity of memory for storing all the information.

SUMMARY OF THE INVENTION

The present invention is made from the above-described point of view. An object of the present invention is to provide an information receiving apparatus that displays only local information without using a large amount of memory.

According to the present invention, there is provided an information receiving apparatus, which comprises: storing means for storing pairs of area information assigned for predetermined areas and area name thereof; area information detecting means for detecting area information contained in received information; area name detecting means for detecting an area name of the current position of the apparatus corresponding to the detected area information with reference to the storing means; searching means for searching for a message element for the area name of the current position of the apparatus among a message in the received information; and displaying means for displaying the searched message element on a displaying portion.

These and other objects, features and advantages of the present invention will become more apparent in light of the following detailed description of the best mode embodiments thereof, as illustrated in the accompanying drawings.

DESCRIPTION OF PREFERRED EMBODIMENTS

Figure 1:
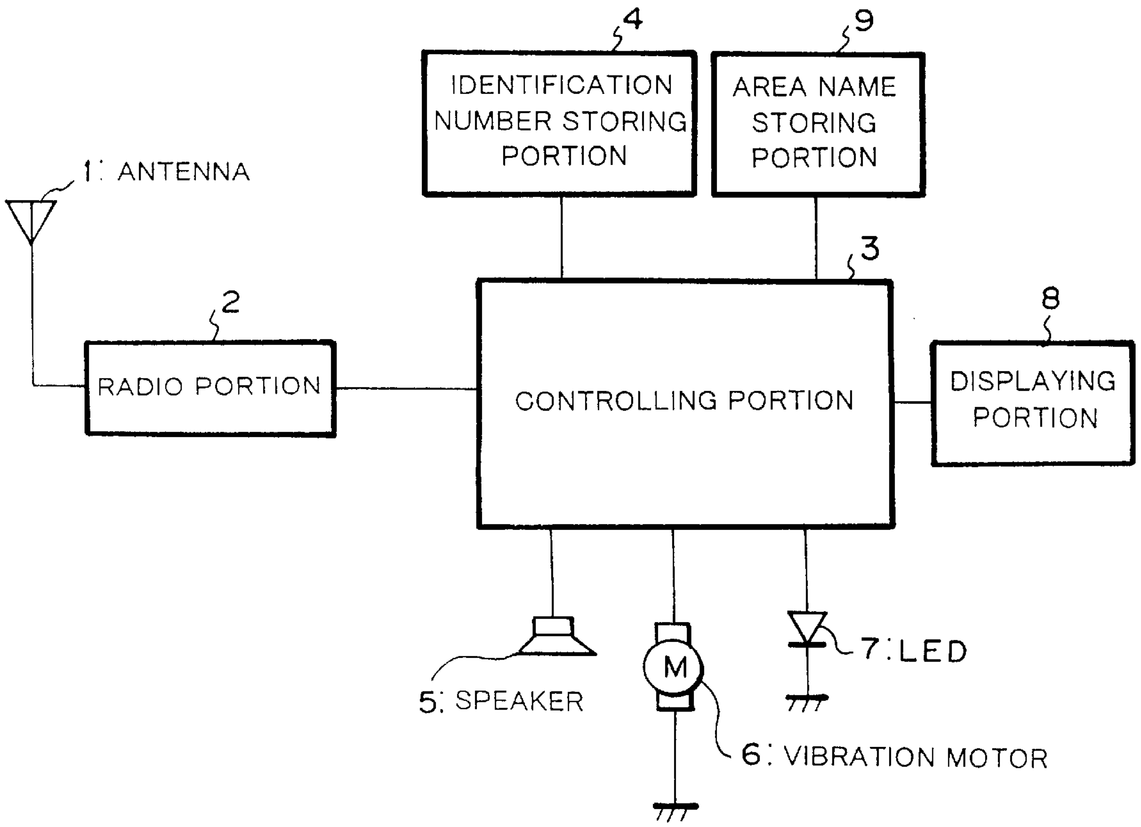
FIG. 1 is a block diagram showing the structure of an information receiving apparatus according to an embodiment of the present invention.
Figure 6:
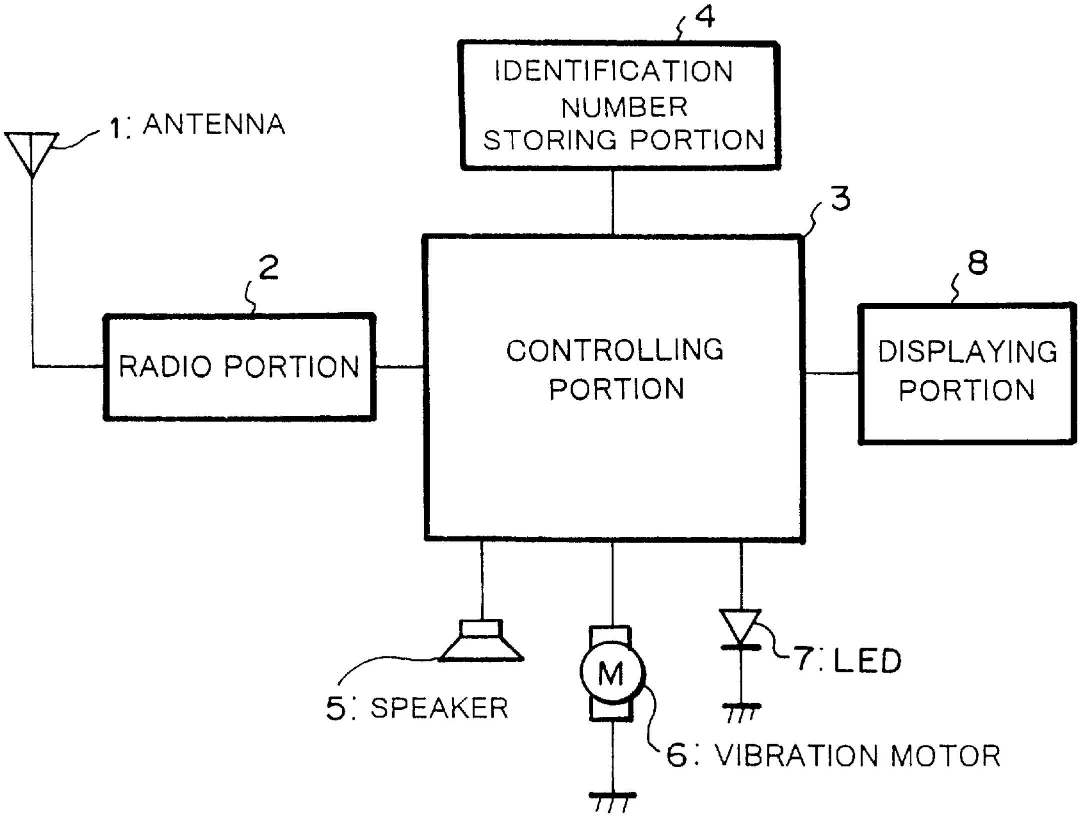
F I G. 6 (PRIOR ART)
FIG. 6 is a block diagram showing the structure of a conventional information receiving apparatus.

Next, with reference to the accompanied drawings, an embodiment of the present invention will be described. FIG. 1 shows the structure of the embodiment of the present invention. For simplicity, in FIG. 1, similar portions to those in FIG. 6 are denoted by similar reference numerals and their description is omitted. In the structure shown in FIG. 1, area name storing portion 9 is added to the structure shown in FIG. 6. Area name storing portion 9 stores pairs of area information in a system information contained in received information and area name of the current positions as mentioned below. The other structure of the apparatus shown in FIG. 1 is the same as the structure of the apparatus shown in FIG. 6. In other words, in FIG. 1, speaker 5, vibrator motor 6, and LED 7 allow the user to know that a message has been received. Identification number storing portion 4 stores the call number of the apparatus.

Figures 2, 3:
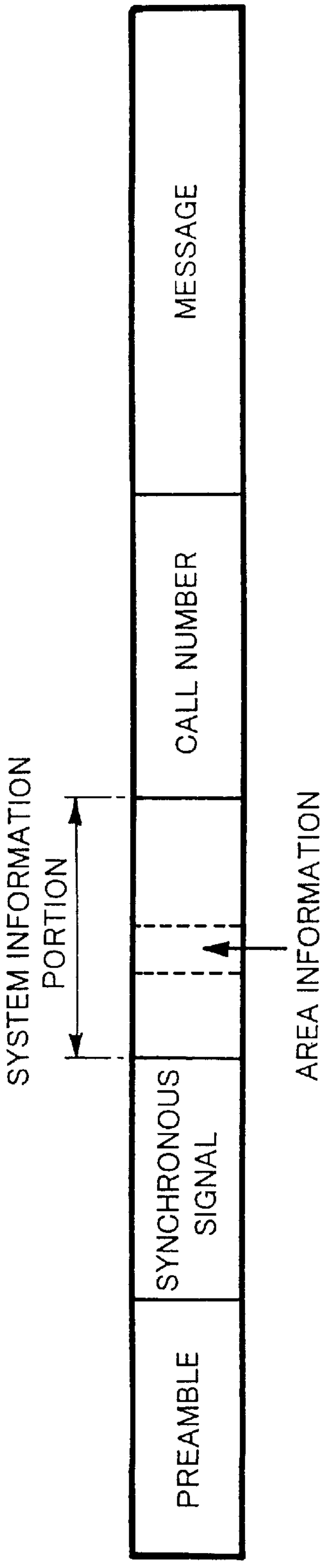
FIG. 2 is a schematic diagram showing the format of information that has been received.
FIG. 3 is a schematic diagram showing the relation between area information and area names stored in area name storing portion 9 according to the embodiment shown in FIG. 1.

FIG. 2 shows the format of information that is sent/received. The information has a preamble, a synchronous signal, a system information portion, a call number, and a message that are disposed in this order. The system information portion includes area information that represents a particular area (namely, unique area information assigned to each area). Since information is sent for each area, with the received information, the apparatus can recognize the current position thereof.

FIG. 3 shows the structure of area name storing portion 9. Area name storing portion 9 stores pairs of numbers that represent area information in the system information portion and area name thereof. In an example shown in FIG. 3, area information 01 represents Hokkaido; area information 02 represents Aomori; . . . ; area information 18 represents Shizuoka.

Figure 4:
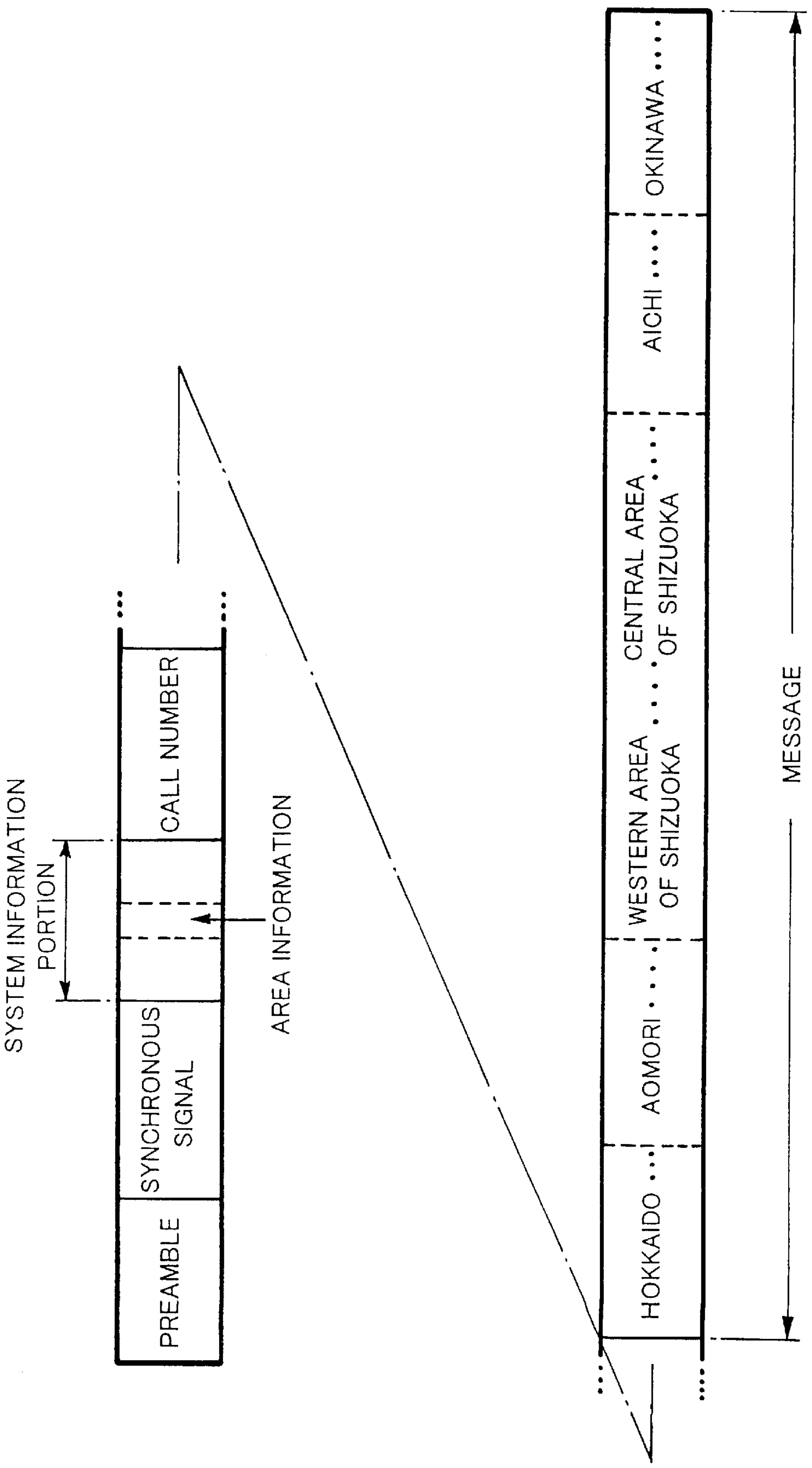
FIG. 4 is a schematic diagram showing weather forecasting information received by the information receiving apparatus according to the embodiment of the present invention.

FIG. 4 shows weather forecasting information received by the apparatus. The structure of the format shown in FIG. 4 is basically the same as the structure of the format shown in FIG. 2. In FIG. 4, the information has a preamble, a synchronous signal, and a system information portion that are disposed in the order. The system information portion contains "18" as an example of area information. With the area information "18", the apparatus knows that the current position thereof is Shizuoka Prefecture. The system information is followed by a call number and weather forecasting information of each area.

Figure 5:
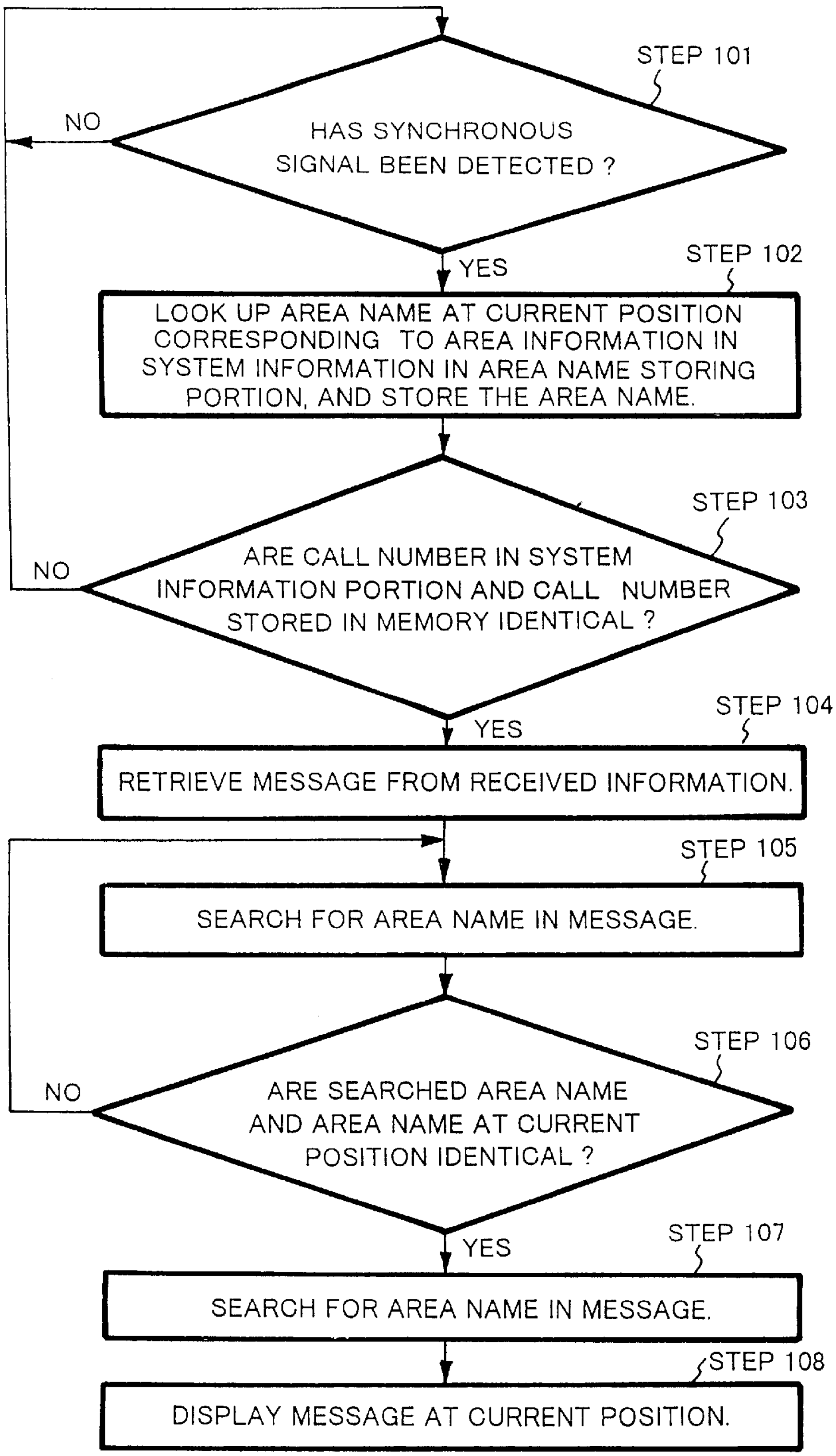
FIG. 5 is a flow chart for explaining the operation of the embodiment shown in FIG. 1.

Next, with reference to FIG. 5, the operation of the apparatus according to the embodiment will be explained. In FIG. 5, when information is received by antenna 1, the information is supplied to radio portion 2. Radio portion 2 amplifies and demodulates the signal received from antenna 1. The demodulated information is supplied to controlling portion 3. Controlling portion 3 decodes the demodulated information and searches a synchronous signal (at step 101). When controlling portion 3 has decoded the synchronous signal, it reads the area information from the system information portion and searches among area name storing portion 9 for an area name of the current position of the apparatus corresponding to the area information. Thereafter, controlling portion 3 stores the searched area name at the current position to a memory of the apparatus (at step S102). When the area information is "18" as shown in FIG. 4, controlling portion 3 searches among area name storing portion 9 shown in FIG. 3 for the area information "18" and knows that the area name corresponding to the area information is Shizuoka Prefecture.

Thereafter, controlling portion 3 detects a call number in the received information and compares the detected call number with a call number stored in identification number storing portion 4 (at step 103). When these call numbers are identical (namely, the determined result at step 103 is Yes), the controlling portion receives a message (in this case, weather forecasting information for each area) in the received information, processes the message in a predetermined manner, and converts the resultant information into characters (at step 104). When the call number of the received information and the call number stored in the identification number storing portion 4 are not identical (namely, the determined result at step 103 is No), the flow returns to step 101.

Thereafter, controlling portion 3 searches for one of the area names from the beginning of the message (weather forecasting information) that has been converted to characters (at step 105). Next, controlling portion 3 compares the searched area name with the area name stored in the memory of the apparatus (at step 106). When these call numbers are identical (namely, the determined result at step 106 is Yes), controlling portion 3 knows that the following portion of the message is of the current position of the apparatus. Controlling portion 3 repeats the process in a loop from steps 105 to 106 until it detects the beginning of the message of the area corresponding to the current position of the apparatus. For example, when the area name of the area corresponding to the current position of the apparatus is Shizuoka, message elements corresponding to the current position of the apparatus are "Western Area of Sizuoka Prefecture, . . . ", "Central Area of Sizuoka Prefecture, . . . ", and so forth as shown in FIG. 4.

Next, controlling portion 3 searches for one of area names among the received message so as to detect the end of the message element corresponding to the current position of the apparatus (at step 107). For example, in the example shown in FIG. 5, when controlling portion 3 detects Aichi Prefecture which follows Shizuoka Prefecture, it knows that the message element corresponding to the current position of the apparatus is completed. Regardless of the order of areas in the message elements, when controlling portion 3 detects any area name, it knows that the message element corresponding to the current position is completed. When controlling portion 3 detects all messages elements corresponding to the current position of the apparatus, controlling portion 3 stores these message elements to the memory and displays them on displaying portion 8 (at step 108). In the example shown in FIG. 5, messages elements for the area (for example, Shizuoka Prefecture) corresponding to the current position of the apparatus are displayed. In other words, in this case, message elements "Western Area of Shizuoka, . . . " and "Central Area of Sizuoka, . . . " are displayed. Thereafter, the process is completed.

With another process, each message element (namely, each region of Shizuoka Prefecture) can be paragraphed on displaying portion 8.

In addition, the information receiving apparatus may be equipped with a means which allows the user to enable/disable the function for selectively displaying only message elements corresponding to the current position of the apparatus.

As described above, according to the present invention, since only message elements for an area name at the current position of the apparatus can be selectively displayed, the user can effectively and quickly read only desired information. In addition, since message elements for undesired areas are removed, the capacity of the memory can be decreased.

Although the present invention has been shown and explained with respect to the best mode embodiments thereof, it should be understood by those skilled in the art that the foregoing and various other changes, omissions, and additions in the form and detail thereof may be made therein without departing from the spirit and scope of the present invention.

What is claimed is:

1. A location detecting information receiving apparatus comprising:

a relating table for relating plurality of first area information each corresponding to a predetermined area with area names;

area information detecting means for detecting second area information contained in received information;

area name detecting means for detecting an area name of the current position of the apparatus corresponding to the detected second area information based upon a comparison with the plurality of first area information held in said table;

searching means for searching a message portion of said received information for a message element identifying said detected area name of the current position of the apparatus contained in the message portion of said received information; and displaying means for displaying said message element on a displaying portion.

2. The location detecting information receiving apparatus as set forth in claim 1, wherein said searching means detects an area name at the current position of the apparatus in said message portion of said received information so as to detect the beginning of said message element corresponding to said detected area name at the current position of the apparatus.

3. The location detecting information receiving apparatus as set forth in claim 2, wherein said searching means, after detecting the beginning of said message element for the detected area name at the current position of the apparatus, detects any subsequent area name in said message portion of the received information so as to detect the end of said message element corresponding to the detected area name at the current position of the apparatus.

4. The location detecting information receiving apparatus as set forth in claim 3, further comprising:

means for enabling/disabling said searching means and said displaying means.

5. The location detecting information receiving apparatus as set forth in claim 2, further comprising:

means for enabling/disabling said searching means and said displaying means.

6. The location detecting information receiving apparatus as set forth in claim 1, further comprising:

means for enabling/disabling said searching means and said displaying means.

7. A location detecting information receiving apparatus, which comprises:

a table for relating a plurality of area information, each area information being assigned to a predetermined area, and a character code string of each area name corresponding to each area information, the plurality of area information and corresponding character code string being related before a stream of information is received;

area information means for detecting area information contained in the received stream of information;

area name retrieving means for looking up the character code string of the area name of the current position of the apparatus corresponding to the detected area information from said table;

searching means for searching for a message portion coming after the detected area information in said stream of said received information for a character code string identical with the looked up character code string;

extracting means for extracting a message element which follows the searched character code string and is a subset of said message portion; and displaying means for displaying said extracted message element on a displaying portion.

8. The location detecting information receiving apparatus as set forth in claim 7, wherein said searching means, after the character code string identical with the received character code string has been searched, searches for a character code string of any area name held in said table so as to detect the end of said message element.

9. The location detecting information receiving apparatus as set forth in claim 8, further comprising means for enabling/disabling said searching means and said displaying means.

10. The location detecting information receiving apparatus as set forth in claim 7, further comprising means for enabling/disabling said searching means and said displaying means.

* * * * *

UNITED STATES PATENT AND TRADEMARK OFFICE

CERTIFICATE OF CORRECTION

PATENT NO. : 6,226,522 B1
DATED : May 1, 2001
INVENTOR(S) : N. Higuchi

It is certified that error appears in the above-identified patent and that said Letters Patent is hereby corrected as shown below:

Title page,
Item [56], References Cited, OTHER PUBLICATIONS, "9808604.0" should read -- 9808601.0 --

Signed and Sealed this

Twenty-ninth Day of January, 2002

*Attest:*

JAMES E. ROGAN
*Director of the United States Patent and Trademark Office*

*Attesting Officer*